United States Patent
Tan et al.

(10) Patent No.: US 11,281,772 B2
(45) Date of Patent: Mar. 22, 2022

(54) SYSTEMS AND METHODS TO DETECT KEY LOGGERS

(71) Applicant: DELL PRODUCTS L.P., Round Rock, TX (US)

(72) Inventors: Danilo O. Tan, Austin, TX (US); Mohit Arora, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 16/526,575

(22) Filed: Jul. 30, 2019

(65) Prior Publication Data
US 2021/0034743 A1    Feb. 4, 2021

(51) Int. Cl.
*G06F 21/00*    (2013.01)
*G06F 21/55*    (2013.01)
*G06F 21/56*    (2013.01)

(52) U.S. Cl.
CPC .......... *G06F 21/554* (2013.01); *G06F 21/566* (2013.01); *G06F 21/568* (2013.01); *G06F 2221/033* (2013.01)

(58) Field of Classification Search
CPC .... G06F 21/554; G06F 21/566; G06F 21/568; G06F 2221/033; G06F 21/50; G06F 21/55; G06F 21/56; G06F 21/577
See application file for complete search history.

(56) References Cited

U.S. PATENT DOCUMENTS

| | | | |
|---|---|---|---|
| 8,225,397 B1 * | 7/2012 | Austin | G06F 21/55 726/22 |
| 8,707,437 B1 * | 4/2014 | Ming-Chang | G06F 21/566 726/24 |
| 9,853,748 B2 | 12/2017 | Prendergast et al. | |
| 2011/0320816 A1 * | 12/2011 | Yao | G06F 21/316 713/171 |

* cited by examiner

*Primary Examiner* — Edward Zee
(74) *Attorney, Agent, or Firm* — Egan, Enders & Huston LLP.

(57) ABSTRACT

Systems and methods are provided for detecting the presence of a key logger program that is executing on a processing device of an information handling system by inputting simulated keystrokes to an information handling system with known key stroke characteristic/s (e.g., quantity of keystrokes as a function of time, keystroke data size as a function of time, and/or keystroke values as a function of time), and monitoring to detect resulting system activity characteristics that match the known key stroke characteristic/s of the simulated key strokes.

25 Claims, 5 Drawing Sheets

SYSTEMS AND METHODS TO DETECT KEY LOGGERS

FIELD

The present invention relates generally to information handling systems, and more particularly, to detection of key loggers executing on information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key logger is a software program designed to secretly monitor and log all keystrokes entered by a user to an information handling system. Legitimate programs may have a keylogging function which can be used to call certain program functions using "hotkeys," or to toggle between keyboard layouts. However, malicious key loggers are also used to steal user data relating to online payment systems, and virus developers are constantly creating new key loggers for this purpose.

Standard key loggers have a few basic characteristics. They log keys by hooking system calls, a service provided by operating system (OS), they store/cache the keys, usually on the system storage disk, and optionally transmit the logged data over a network connected to the information handling system. Many key loggers also hide themselves in the system. Detection of hidden key loggers requires the user to manually inspect all running processes, look for active network connections, and use good signature-based anti-malware/anti-virus software for existing and well-known key logger programs.

SUMMARY

Disclosed herein are systems and methods for detecting the presence of a key logger program that is executing on a processing device of an information handling system. In one embodiment, the disclosed systems and methods may be implemented in an automated manner to detect a key logger program without requiring manual inspection of the system by a system user, e.g., without requiring a system user to manually inspect all running processes, look for active network connections, and/or to rely on a signature-based anti-malware/anti-virus software to detect the key logger program. In one embodiment, the disclosed systems and methods may be so implemented in a non-signature based manner to detect both known and unknown key loggers executing on a processing device of a controlled information handling system in which there should be no key logger installed. In a further embodiment, the disclosed systems and methods may be advantageously scaleable (e.g., as a deployed test software application) to execute and perform on multiple information handling systems.

The disclosed systems and methods may be implemented in one embodiment to detect key logger programs by simulating keystrokes that are input to a processing device of an information handling system with known key stroke characteristic/s (e.g., frequency or other keystroke quantity pattern as a function of time, pattern of keystroke data size as a function of time, pattern of keystroke value as a function of time, and/or a pattern of keystroke data independent of time), and monitoring to detect resulting system resource activity usage characteristics that match the known key stroke characteristic/s of the simulated key strokes. Examples of system resource activity usage characteristics that may be so monitored include, but are not limited to, typical operating characteristic/s utilized by executing key logger programs, such as storage (e.g., storage disk or solid state drive) data write activity, host processing device (host programmable integrated circuit such as CPU) data processing activity, and/or network (e.g., Internet) data transmission activity. In an optional embodiment, a cryptographically random stream of character key strokes may be simulated to allow inspection of all system storage data writes and network data transmissions in order to achieve at or near 100% accurate detection of the presence of a hidden key logger.

In a further embodiment, one or more automated actions may be implemented when a potential key logger process has been identified as executing on processing device of an information handling system. Examples of such automatic actions include, but are not limited to, remediation steps that may range from providing a simple notification to the system user that a key logger is potentially present, to a more complex quarantine process. For example, the input/output (I/O) signals of a suspected key logger process may be scrutinized further by correlating the amount of data written by the suspected key logger process to the key sizes of the simulated key strokes. Additionally or alternatively, outgoing network packets from the system may be checked further for evidence of captured keys, and/or the identity of the destination remote network endpoint to which the outgoing packets are being sent may be checked against a white list and/or black list of websites. In the latter case, the outgoing network packets may be blocked from network data transmission to the destination network endpoint when the work endpoint is found to blacklisted (and/or found not to be whitelisted), as the case may be.

In some embodiments, the disclosed systems and methods may be implemented with optional additional protections to harden a test application of the disclosed systems and methods to mitigate external threats which may disable, work around or skew the solution and results. For example, test application logic that implements the disclosed systems and methods on an information handling system may be run as an installed Service or Daemon to protect against removal by a key logger, and/or may be run as an elevated SYSTEM or Root process (requiring root access to disable) to protect against disablement by a key logger. In some embodiments, a test application of the disclosed systems and methods may be implemented with optional additional enhancements to further improve the results/output of the test application, including steps that may be implemented to reduce the system noise within monitored system components (e.g., host processing device, storage drive, network interface, etc.). In another embodiment, a test application may be implemented with the capability to be run on-demand to help reduce system noise by: disabling keyboard and mouse so users don't generate additional key strokes and/or workload on the information handling system, shutdown whitelisted applications to filter out known-good activity, and/or letting the information handling system stabilize before enabling the test application to search for key loggers.

In one respect, disclosed herein is a method, including: providing simulated keystroke input data for a programmable integrated circuit of an information handling system, the simulated keystroke input data has one or more known characteristics; monitoring system resource usage activity of at least one of the programmable integrated circuit or of at least one other information handling system component that is coupled to the programmable integrated circuit while providing the simulated keystroke input data to the programmable integrated circuit; and detecting the existence of a key logger process executing on the programmable integrated circuit by identifying at least one characteristic of the monitored system resource usage activity that at least partially corresponds to at least one of the known characteristics of the simulated keystroke input data.

In another respect, disclosed herein is an information handling system, including at least one programmable integrated circuit programmed to: process data and provide simulated keystroke input data for the programmable integrated circuit, the simulated keystroke input data having one or more known characteristics; monitor system resource usage activity of the least one of the programmable integrated circuit or of at least one other information handling system component that is coupled to the programmable integrated circuit while providing the simulated keystroke input data to the programmable integrated circuit; and detect the existence of a key logger process executing on the programmable integrated circuit by identifying at least one characteristic of the monitored system resource usage activity that at least partially corresponds to at least one of the known characteristics of the simulated keystroke input data.

DETAILED DESCRIPTION OF ILLUSTRATIVE EMBODIMENTS

Figure 1:
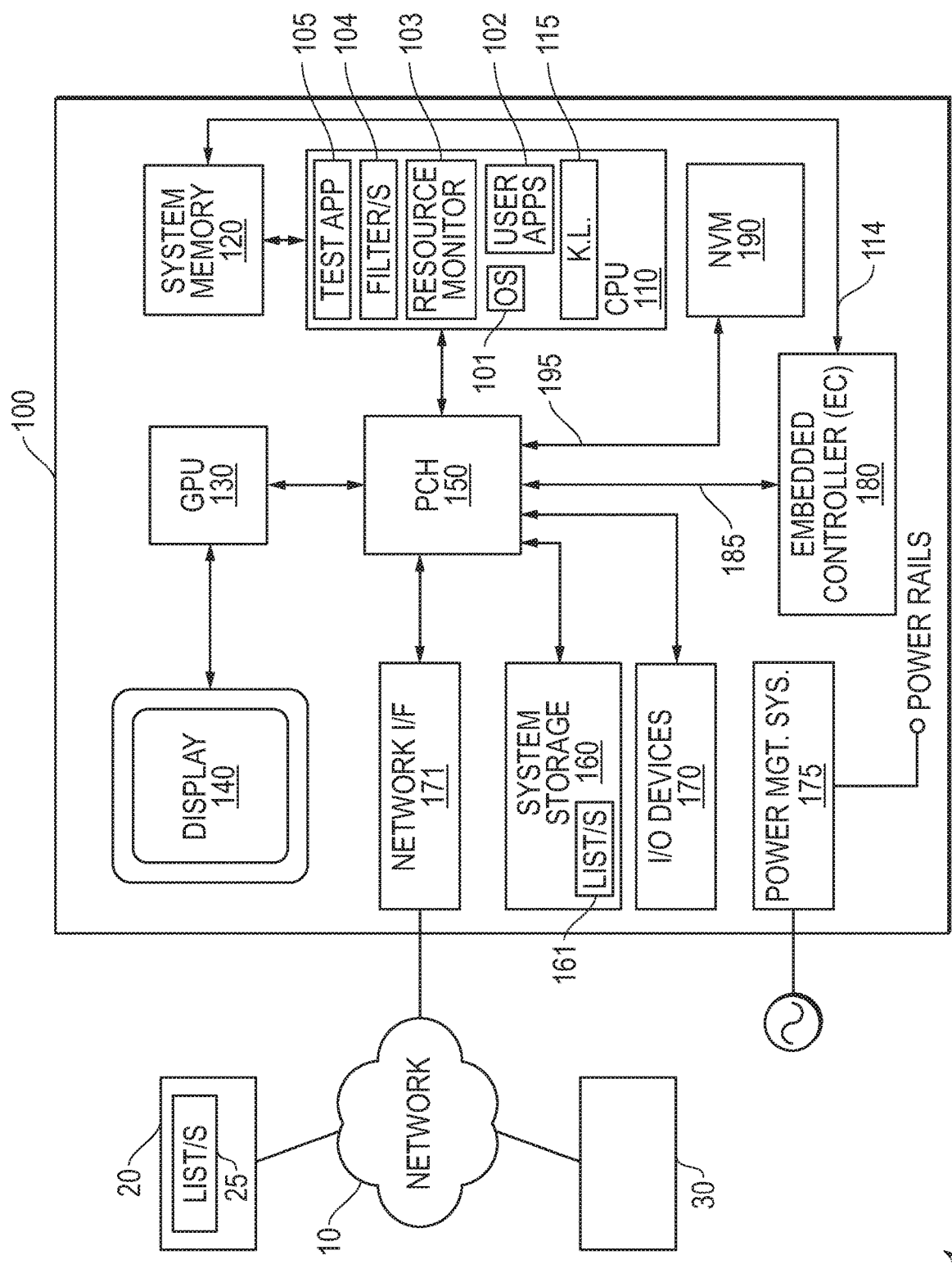
FIG. 1 is a block diagram of an information handling system as it may be configured according to one exemplary embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host processing device 110 (host programmable integrated circuit such as a central processing unit (CPU)), for executing an operating system (OS) 101 (e.g., Microsoft Windows-based OS such as Windows 10, Linux OS, etc.) for system 100, and other code such as user software applications 102 (e.g., word processing application, Internet browser, computer game, PDF viewer, spreadsheet application, etc.), resource monitor 103, one or more filter driver/s 104, test application 105, etc. A hidden key logger 115 is also shown executing on host processing device 110, e.g., without knowledge of a human user of system 100. As will be described further herein, resource manager 103, test application 105 and filter driver/s 104 may be executed together to detect presence of hidden key logger 115 and then take one or more actions in response to such detection of the hidden key logger 115.

In FIG. 1, CPU 110 may also be configured to access non-volatile memory 190 (e.g., serial peripheral interface (SPI) Flash memory) to load and boot a system BIOS. Other non-volatile memory (NVM) devices may be additionally or alternatively present, e.g., including solid state drive/s (SSDs), hard drive/s, etc. CPU 110 may include any type of processing device, such as an Intel Pentium series processor, an Advanced Micro Devices (AMD) processor or another programmable integrated circuit. CPU 110 is coupled to system memory 120, which may include, for example, random access memory (RAM), dynamic RAM (DRAM), synchronous DRAM (SDRAM).

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub (PCH) 150.

PCH 150 controls certain data paths and manages information flow between components of the information handling system 100. As such, PCH 150 may include one or more integrated controllers or interfaces for controlling the data paths connecting PCH 150 with CPU 110, GPU 130, system storage 160, input/output (I/O) devices 170 forming at least a part of a user interface for the information handling system, network interface (I/F) device 171, embedded controller (EC) 180 and NVM 190 where BIOS firmware image (e.g., BIOS 194) may be stored. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown, I/O devices 170 (e.g., a keyboard, mouse, touchpad, touchscreen, etc.) are coupled to PCH 150 of system 100 to enable the user to input data and interact with information handling system 100, and to interact with application programs or other software/firmware executing thereon. The network I/F device 171 enables wired and/or wireless communication with remote devices and servers or the like via an external network 10 (e.g., the Internet), and in one embodiment may include a network interface controller (NIC) communicating with network 10 across a local area network (LAN). In one embodiment, network I/F 171 may also include a wireless radio module coupled to one or more antenna elements for enabling wireless network communication, e.g., such as across a cellular network and/or across a wireless local area network (WLAN) via one or more IEEE 802.11x Wi-Fi protocols. Information regarding wireless radio modules and wireless communication techniques which may be implemented for this purpose may be found in U.S. Pat. No. 9,853,748, which is incorporated herein by reference in its entirety for all purposes.

Also shown present in FIG. 1 is local system storage 160 (e.g., one or more media drives, such as hard disk drives, optical drives, NVRAM, Flash memory, solid state drives (SSDs), or any other suitable form of internal or external storage) is coupled to PCH 150 to provide permanent storage for information handling system 100. In the embodiment of FIG. 1, one or more blacklist/s or whitelist/s 161 may be optionally stored on system storage 160 for use by test application 105 to help detect presence of hidden key logger 115 and/or block outgoing network packets as will be described further herein. Additionally or alternatively, one or more similar blacklist/s or whitelist/s 25 may be optionally stored on a remote information handing system 20 (e.g., administrative or IT server) and accessed as required across network 10 by test application 105 for the same purpose.

When present as shown, an unauthorized hidden key logger 115 executes on host processing device 110 to monitor and log user key strokes by hooking system calls provided by OS 101. Key logger 115 stores or caches a log of the monitored key strokes (e.g., on system storage 160), e.g., for transmission as logged data over network 10 to a remote computer system 30 operated by a third party that is unknown to the user of system 100.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system. For example, power management system 175 may be coupled to provide an operating voltage on a primary power rail to PCH 150, and may be further coupled to provide an operating voltage (e.g., 3.3V or other suitable voltage) on another power rail to EC 180. In addition to the power rails explicitly shown in FIG. 1, it is noted that power management system 175 may be coupled to provide additional different operating voltages on one or more additional power rails to PCH 150, EC 180 and other components of information handling system 100.

Embedded controller (EC) 180 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

Figure 2:
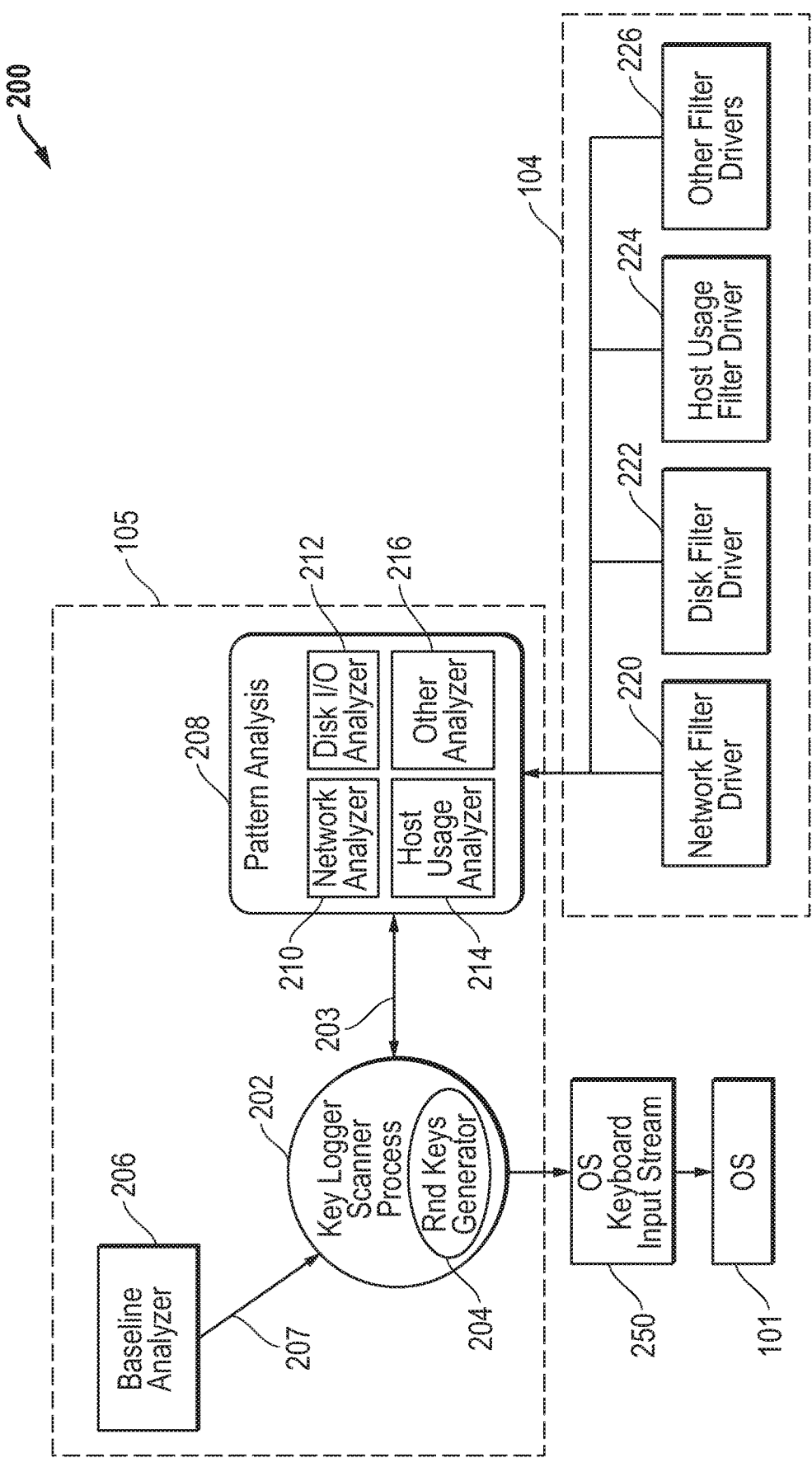
FIG. 2 illustrates a illustrates key logger detector logic architecture according to one exemplary embodiment of the disclosed systems and methods.
Figure 3:
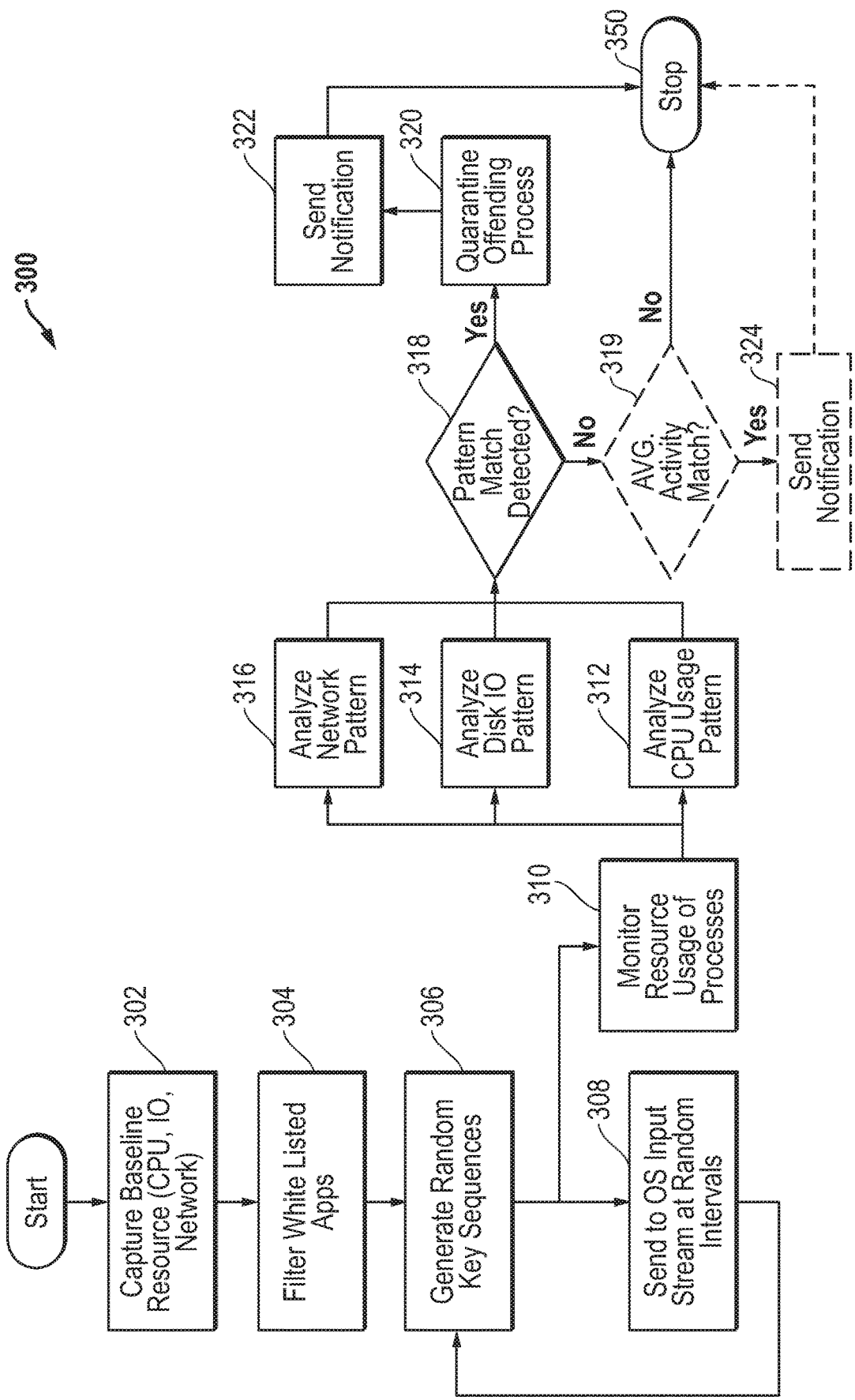
FIG. 3 illustrates methodology according to one exemplary embodiment of the disclosed systems and methods.

FIG. 2 illustrates key logger detector logic architecture 200 and FIG. 3 illustrates key logger detection process flow 300 according to one embodiment of the disclosed systems and methods. Using the architecture 200 and process 300, the presence of a hidden key logger 115 may be positively detected on a clean information handling system 100 by identifying operating characteristics and basic functionality (e.g., by hooking OS system calls, storing/caching logged keys and/or transmitting logged keys as data over network 10).

As shown in FIG. 3, process 300 starts in step 302 where test application 105 is started (e.g., started on-demand in response to a user command, started automatically according to a pre-determined time schedule, etc.) and captures a baseline 207 of current known system resource activity. In one embodiment, system noise (e.g., noise generated by components 110, 160 and 171) may be reduced to improve the quality of baseline activity capture by capturing baseline 207 while all other known good user applications 102 from a whitelist 161 are shut down and host processing device 110 is operating in a steady state, and/or by filtering out system resource activity from those known processes that are maintained on a whitelist 161.

For example, in one embodiment test application 105 may start up in step 302 and cause all known active user applications 102 to be shutdown (e.g., automatically or by instructing the system user to shut down all user applications 102) so that host processing device 110 operates in a "no load" idle state and with no user key stroke, mouse input or other I/O input. Test application 105 may optionally also automatically disable keyboard, mouse and any other I/O devices 170 at this time to ensure no attempted user input. Data processing activity of the host processing device 110 then may be allowed to stabilize in this "no load" steady state, e.g., for a predetermined amount of time such as 30 seconds or one minute or other designated greater or lesser time period, or until monitored data processing activity does not vary more than a designated percent (e.g., 5%) over such a time period. While the host processing device 110 is operating in this no load idle state, the baseline 207 of current system resource activity may then be captured for a predetermined amount of time (e.g., for a one minute time period).

Still referring to step 302, resource activity baseline 207 may be so captured by test application 105 using an internal or external resource monitor tool, application programming interface (API) or hook/call, etc. In one embodiment, resource activity baseline 207 may be provided to test application 105 from internal built-in Microsoft Windows Resource Monitor utility 103 and/or from external Microsoft Sysinternals utilities accessed from a network server via network 10. In one embodiment, this baseline 207 of captured resource activity may include, for example, host processing (e.g., CPU) activity, system storage (e.g., disk or SSD) data write activity and/or network data transmission activity by process without known processes (e.g., applications, components, etc.) that have been shut down to minimize noise and are therefore no longer executing on host processing device 110. Capturing this baseline 207 of system resource activity allows the captured resource activity of the remaining executing system resources to be further analyzed by baseline analyzer logic 206 of test application 105 as shown in FIG. 3.

Next in step 304, the separate resource activity of any remaining known currently-executing applications and any other processes that are included on a whitelist 160 may be filtered out (removed) by baseline analyzer logic 206 from the remaining baseline 207 of current known system resource activity to create a filtered baseline that excludes the resource activity of these applications and processes from the resource activity that includes a possible hidden key logger 115. These filtered applications and/or other processes of step 304 represent applications and other processes that are being used during the key logger detection analysis (e.g., such as test application 105, filter/s 104, etc.) and known trusted applications or processes (e.g., such as Microsoft Resource Monitor 103).

Still referring to FIGS. 2 and 3, random keys generator logic 204 may operate in step 306 as part of key logger scanner process 202 of test application 105 to generate simulated key strokes as one or more keyboard input data stream/s 250 to be sent to the default desktop of the OS 101 in step 308, e.g., via an OS API. During steps 306 and 308, those user applications 102 shutdown in step 302 may remain shutdown to minimize noise. In step 306, random keys generator logic 204 may generate a cryptographically random sequence and/or pattern (e.g., frequency) of key stroke values to produce each randomly generated data stream 250 of keyboard characters. In an alternate embodiment, a specific predetermined sequence of simulated key stroke values and/or pattern (e.g., frequency) may be stored in NVM 190 or storage 160 for use by test application 105 to generate an OS keyboard input data stream 250.

Figure 4:
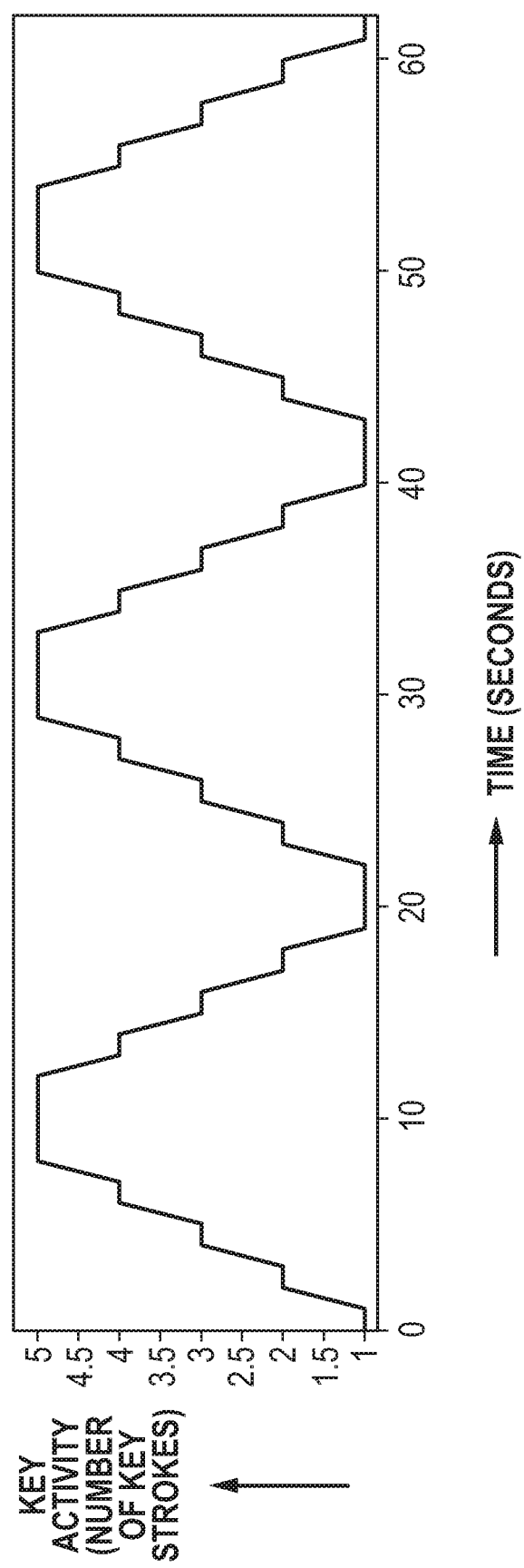
FIG. 4 illustrates a simulated keystroke input pattern according to one exemplary embodiment of the disclosed systems and methods.

However the values of simulated key strokes are determined, the quantity of simulated key strokes that are sent out as an OS keyboard input data stream 250 may be varied as a function of time to create a pattern (e.g., frequency) of key stroke quantity as a function of time (i.e., a number of keystrokes entered versus time) as illustrated in the exemplary embodiment of FIG. 4. In one embodiment, test application 105 may in step 308 output the OS keyboard input data stream 250 that was generated in step 306 at random intervals versus time. In an alternate embodiment, the quantity of characters being sent as a function of time may be defined by a varying, yet pre-determined, frequency or other pattern as a function of time that is stored on and retrieved from NVM 190 or storage 160. Where steps 306 and/or 308 are performed to generate a pattern of random key stroke values or pattern of random key stroke quantity versus time, a random-number generator may be executed by host processing device 110, e.g., as a separate application 102 or as a part of test application 105.

As shown in FIG. 3, step 308 iteratively repeats back to step 306 such that OS keyboard input data stream 250 continues to be generated at random intervals versus time. While the OS keyboard input data stream 250 is being output, the resource usage activity of given processes remaining in the filtered baseline executing on host processing device 110 is monitored in step 310, e.g., while those user applications 102 shut down in step 302 remain shutdown in step 310 to minimize noise. This resource usage activity may be provided separately for each individual executing process (e.g., software and/or firmware applications, services, other logic, etc.) by resource monitor 103 of the filtered baseline that is executing on host processing device 110. In this regard, per process usage of host processing device 110, system storage 160 and network interface 171 may be separately monitored in step 310 by pattern analysis logic 208 of FIG. 2 to detect active processes and processes that are potentially processing key strokes. As shown in FIG. 2, pattern analysis logic 208 receives input data 203 that includes the real time frequency (e.g., quantity of key strokes per unit time) or other real time pattern of key strokes as a function of time from OS keyboard input data stream 250 added to the real time filtered baseline of system resource activity for individual executing processes on host processing device 110.

Next, in steps 312, 314 and 316, the monitored real time activity of each of host processing device 110, system storage 160 and network interface 171 for each executing process on host processing device 110 is analyzed by components of pattern analysis logic 208 and compared to the filtered baseline of system resource activity to detect whether or not this real time activity includes a signal component pattern as a function of time (and/or a data value pattern independent of time) that is above the filtered baseline and corresponds to the simulated key stroke frequency or other type keystroke pattern of OS keyboard input data stream 250, such as illustrated in FIG. 4. Thus, the monitored resource usage activity may be compared against the pattern of injected keystrokes, e.g., to find an actual data match where frequency and/or data values of storage writes, network transmission, CPU utilization, etc. match frequency and/or data values of generated random key generation input. As described below, filter logic 104 may also be implemented in one embodiment to determine the amount of such agreement between signal pattern characteristics of a detected signal component within the monitored real time activity and the simulated key stroke frequency or other type keystroke pattern of OS keyboard input data stream 250.

Referring to the embodiment of FIG. 2, host usage analyzer logic 214 looks in step 312 for any given executing process for which its usage of host processing device 110 corresponds to (e.g., equals to or at least partially corresponds to) the frequency or other pattern of simulated key strokes of OS keyboard input data stream 250 that is added to (over and above) the filtered baseline of system resource activity for that given executing process. A host usage filter driver 224 may be present in step 312 to look for characteristics of the simulated key strokes of OS keyboard input data stream 250 in host processing device activity by determining the amount of agreement between signal pattern characteristics within the monitored real time host processing device activity, and the simulated key stroke frequency or other type of keystroke pattern of OS keyboard input data stream 250 such as shown in FIG. 4. For example, in one embodiment host usage filter driver 224 may look for resource spikes every time a simulated keystroke is sent. In another embodiment, a normalized pattern match may be generated over a designated "X" period of time where resource activity matches a random keystroke injection frequency, where "X" is a selected amount of time such as thirty seconds or other greater or lesser time value.

In one embodiment, the amount of agreement between signal pattern characteristics within the monitored real time host processing device activity, and the simulated key stroke frequency or other type of keystroke pattern of OS keyboard input data stream 250, may be calculated as a value of $((1.0-\Delta)\times100)$, where $\Delta$ is the measured difference between signal pattern characteristics within the monitored real time host processing device activity, and the simulated key stroke frequency or other type of keystroke pattern and/or data values of OS keyboard input data stream 250.

Figure 5:
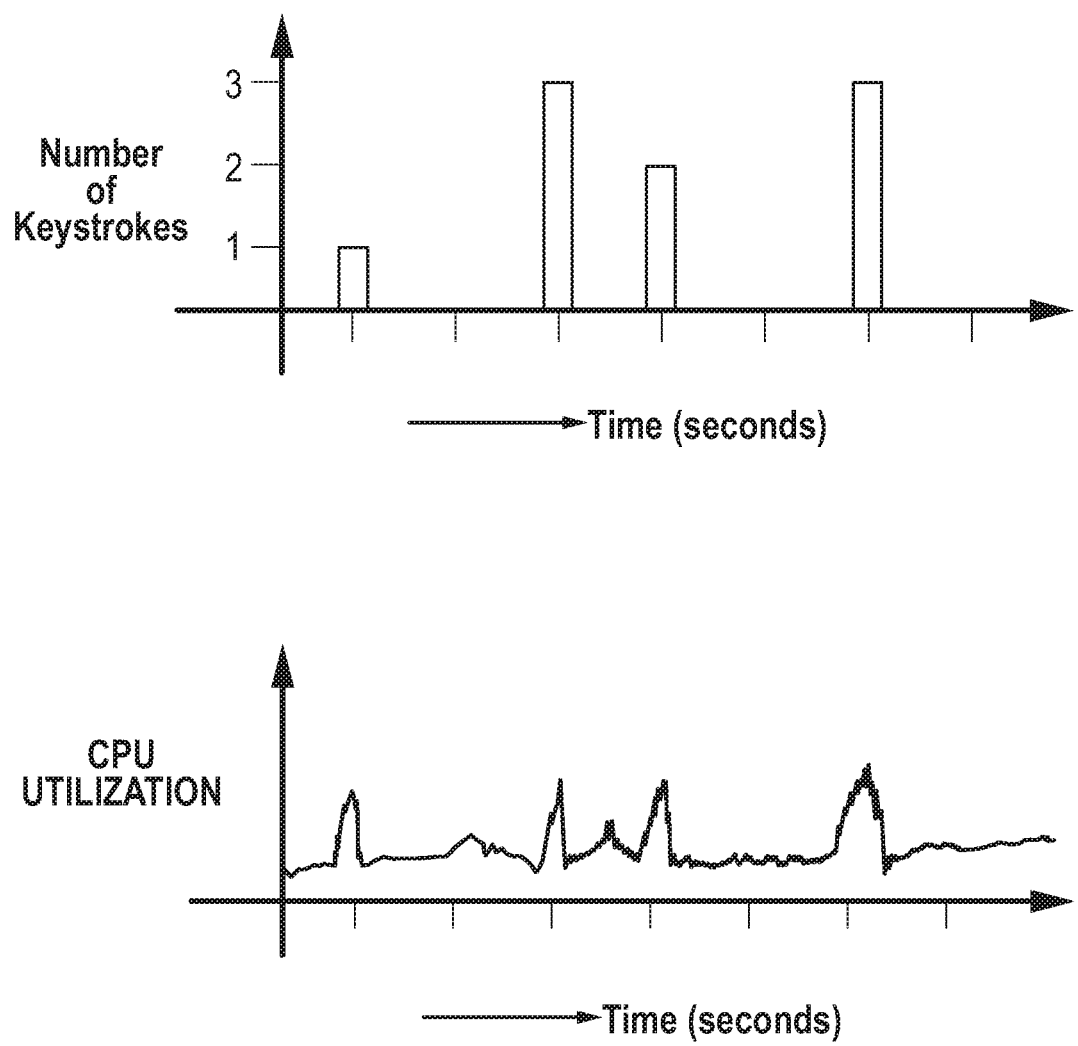
FIG. 5 illustrates a simulated correlation between a simulated keystroke pattern and resulting host usage activity pattern according to one exemplary embodiment of the disclosed systems and methods.

FIG. 5 illustrates a simulated correlation between a simulated keystroke pattern and a resulting host usage activity pattern (e.g., in this case CPU utilization) as it is obtained from monitored real time host processing device activity. As shown, peaks in CPU utilization correspond (or correlate) in time to number of simulated keys injected as a function of time.

In one embodiment, presence of a key logger 115 executing on host processing device 110 may be detected as a pattern match in step 318 when a measured amount of agreement from step 312 meets or exceeds a predetermined minimum host processing device activity agreement threshold value that may be stored, for example, on system storage 160. Such a predetermined minimum host processing device activity agreement threshold value may be may be selected based on user risk tolerance. Example values that may be employed for minimum host processing device activity agreement threshold value include greater than or equal to 80 percent agreement (alternatively greater than or equal to 90 percent agreement, alternatively equal to 100 percent agreement), although minimum host processing device activity threshold values less than 80 percent agreement are also possible in other embodiments.

Still referring to the embodiment of FIG. 2, storage (e.g., disk or SSD) I/O analyzer logic 212 looks in step 314 for any pattern characteristics of storage (e.g., disk or SSD) system activity to system storage 160 that corresponds to the frequency or other pattern of simulated key strokes of OS keyboard input data stream 250 that is added to (over and above) the filtered baseline of system resource activity for that given executing process. Similar to the host usage filter driver 224, a storage filter driver 222 may be employed in step 316 to look for characteristics of the simulated key strokes of OS keyboard input data stream 250 in the storage data write activity to storage 160 by determining the amount of agreement between signal pattern characteristics within the monitored storage data write activity and the simulated key stroke frequency or other type of keystroke pattern of OS keyboard input data stream 250. In one embodiment, presence of a key logger 115 executing on host processing device 110 may be detected as a pattern match in step 318 when a measured amount of agreement from step 314 meets or exceeds a predetermined minimum outgoing storage data write activity threshold value that may be stored, for example, on system storage 160. Such a predetermined minimum storage data write activity threshold value may be selected based on user risk tolerance.

Example values that may be employed for minimum storage data write activity threshold value include greater than or equal to 80 percent agreement (alternatively greater than or equal to 90 percent agreement, alternatively equal to 100 percent agreement), although minimum storage data write activity threshold values less than 80 percent agreement are also possible in other embodiments. Similar to before, the amount of agreement may be calculated as $((1.0-\Delta)\times100)$ where $\Delta$ is the measured difference between signal pattern characteristics within the monitored real time average storage data write activity and the simulated key stroke frequency or other type of keystroke pattern of OS keyboard input data stream 250.

In similar manner, network analyzer logic 210 looks in step 316 for any pattern characteristics of outgoing network traffic activity from network interface 171 to network 10 that corresponds to the frequency or other pattern of simulated key strokes of OS keyboard input data stream 250 that is added to (over and above) the filtered baseline of system resource activity for that given executing process. Similar to the host usage filter driver 224 and storage filter driver 222, a network filter driver 220 may be employed in step 314 to look for characteristics of the simulated key strokes of OS keyboard input data stream 250 in the outgoing network traffic activity by determining the amount of agreement between signal pattern characteristics within the monitored outgoing network activity and the simulated key stroke frequency or other type of keystroke pattern of OS keyboard input data stream 250 generated by test application 105. Such a network filter driver 220 may be located higher in the stack, e.g., prior to any standard HTTPS encryption.

In one embodiment, presence of a key logger 115 executing on host processing device 110 may be detected as a pattern match in step 318 when a measured amount of agreement from step 314 meets or exceeds a predetermined minimum outgoing network activity threshold value that may be stored, for example, on system storage 160. Such a predetermined minimum outgoing network activity threshold value may in one embodiment be selected based on system user risk tolerance. Example values that may be employed for predetermined minimum outgoing network activity threshold value include greater than or equal to 80 percent agreement (alternatively greater than or equal to 90 percent agreement, alternatively equal to 100 percent agreement), although minimum outgoing network activity threshold values less than 80 percent agreement are also possible in other embodiments. Similar to before, the amount of agreement may be calculated as $((1.0-\Delta)\times100)$ where $\Delta$ is the measured difference between signal pattern characteristics within the monitored real time average outgoing network activity and the simulated key stroke frequency or other type of keystroke pattern of OS keyboard input data stream 250.

Next, if a match is found in step 318 between the pattern of simulated key strokes of OS keyboard input data stream 250 that is added to the filtered baseline of system resource activity for a given executing process, then a potential key logger process 115 has been identified. Once such a potential key logger process 115 has been identified, the system can provide a number of remediation steps ranging from a simple notification to the system user to more complex quarantine process. For example, methodology 300 may then proceed to step 320 where this given identified process is quarantined (e.g., shut down, blocked, etc.) on host processing device 110. Further steps may optionally be taken, e.g., the I/O of the given identified process may be scrutinized or analyzed further (e.g., for the presence of captured keys) where the amount of data written to system storage 160 correlates with the simulated key stroke sizes of OS keyboard input data stream 250, the network packets of network interface 171 may be checked further for presence of captured keys, etc.

A notification may be sent in step 322 that describes this discovery and shutdown of an offending process (e.g., including the identity of the offending process), before methodology 300 terminates in step 350. This notification may sent, for example, to the system user (e.g., displayed on display device 140) and/or may be sent to a remote administrative or IT server 20 across network 10. Other information that may be provided to a user or to an IT server or security backend 20 includes identity of a remote network endpoint 30 to which a detected key logger 115 has attempted to transmit captured key strokes, e.g., so that the identity of the remote endpoint 30 may be checked or compared against a list (blacklist and/or a whitelist) of network sites to see if the identity of the remote network endpoint 30 is blacklisted or whitelisted. It will be understood that a list 161 (whitelist or blacklist) may be maintained locally on the information handling system 100 and/or may be maintained as list/s 25 on a remote server 20 (e.g., an information technology (IT) or security backend server).

Still referring to FIG. 3, if no pattern match is found in step 318, then methodology 300 may terminate in step 350 (i.e., without intervening optional steps 319 and 324). Although FIG. 3 shows methodology 300 may directly terminate after performance of step 322 or ending in a "No" branch of step 318, it will be understood that methodology 300 may instead iteratively repeat (without terminating) to step 302 from step 322 or after ending in a "No" branch of step 318.

In another exemplary embodiment, an optional step 319 (shown in dashed outline in FIG. 3) may be performed as shown to determine whether any given executing process is exhibiting an average resource usage activity (e.g., average of host processing device activity, storage activity and optionally network activity) which corresponds to (e.g., equals to or at least partially corresponds to) the frequency or other key stroke pattern of OS keyboard input data stream 250 (e.g., such as illustrated in FIG. 4). Similar to previously described, a measured amount of agreement between averaged process resource activity and the key stroke pattern of OS keyboard input data stream 250 may be based on observation of a minimal delta or difference (e.g., in decimal value or percentage) between the pre-determined key stroke pattern and the measured resource usage activity pattern averaged across host processing device, storage device and (optionally) network activity. As before, this amount of agreement may be calculated as a value of $((1.0-\Delta)\times100)$, where $\Delta$ is the measured difference between actual signal pattern characteristics within the monitored real time average resource usage activity and the simulated key stroke frequency or other type of keystroke pattern of OS keyboard input data stream 250.

Similar to methodology of step 318, presence of such a suspicious process executing on host processing device 110 may be detected as being present in step 319 when a measured amount of agreement is found to exist between the averaged process resource activity and the key stroke pattern of OS keyboard input data stream 250 meets or exceeds a predetermined minimum average activity agreement threshold value that may be stored, for example, on system storage 160. Such a predetermined minimum average activity threshold value may in one embodiment be selected based on system user risk tolerance. Example values for predetermined minimum average activity threshold value include greater than or equal to 80 percent agreement (alternatively greater than or equal to 90 percent agreement, alternatively equal to 100 percent agreement), although minimum average activity threshold values less than 80 percent agreement are also possible in other embodiments. If presence of such a suspicious process executing on host processing device 110 is detected in step 319, then methodology 300 proceeds to step 324 where a notification is sent in step 324 that describes this discovery of a suspicious process (e.g., including the identity of the offending process), before methodology 300 terminates in step 350 as previously described.

In other embodiments, additional or alternative characteristics (besides signal component pattern) of the real time activity of host processing device 110, system storage 160 and/or network interface 171 may be additionally or alternatively measured and analyzed to detect a key logger 115. One example of such an additional characteristic is key stroke value of each simulated key stroke of OS keyboard input data stream 250, in which case key stroke values present in host data processing activity, storage data write activity and/or outgoing network traffic activity may be compared to the simulated key stroke values of keyboard input data stream 250 to determine an amount of agreement between the pattern of simulated key stroke values of OS keyboard input data stream 250 and the monitored key stroke values of host data processing activity, storage data write activity and/or outgoing network traffic activity. In one example, this amount of agreement may be calculated as the portion (e.g., percentage) of simulated key stroke values of OS keyboard input data stream 250 that are matched by actual key stroke values monitored in the resource usage activity of host processing device 110, system storage 160 and/or network interface 171.

In another embodiment, an additional characteristic of the real time activity of host processing device 110, system storage 160 and/or network interface 171 that may be additionally or alternatively monitored and analyzed is data size. Monitoring and analyzing key stroke data size within resource usage activity of host processing device 110, system storage 160 and/or network interface 171 may be employed to look for a match between key stroke data size within the actual monitored resource usage activity and the key stroke data size within simulated OS keyboard input data stream 250. For example, OS keyboard input data stream 250 may be generated to include random key strokes in 16 byte increments. In such a case, data size within host processing device activity, system storage data write activity, and/or outgoing network traffic activity may be analyzed to detect data size matches that are padded to 16 byte boundaries. In this way, a hidden key logger 115 may be detected that encrypts captured key stroke data entered via I/O devices 170 by a system user, e.g., using a cipher that encrypts in block sizes using 16 byte increments.

It will be understood that the steps of FIG. 3 are exemplary only, and that any combination of fewer, additional and/or alternative steps may be employed that is suitable to detect a key logger program by simulating keystrokes input to a processing device of an information handling system with a designated and specific known characteristic (e.g., frequency or other keystroke quantity pattern, data size pattern, and/or key value pattern), and monitoring for resulting system activity resource usage characteristics that match the known key stroke characteristic/s of the simulated key strokes.

It will also be understood that one or more of the tasks, functions, or methodologies described herein (e.g., including those described herein for components 110, 130, 180, 20, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   providing simulated keystroke input data for a programmable integrated circuit of an information handling system, the simulated keystroke input data being provided as a pattern of simulated keystrokes that varies as a function of time;
   monitoring system resource usage activity versus time of the programmable integrated circuit or of at least one other information handling system component that is coupled to the programmable integrated circuit while providing the simulated keystroke input data to the programmable integrated circuit; and
   detecting the existence of a key logger process executing on the programmable integrated circuit by identifying one or more peaks in the monitored system resource usage activity that correspond in time to the varying pattern of the simulated keystroke input data.

2. The method of claim 1, where the one or more peaks in monitored system resource usage activity comprise at least one of one or more monitored peaks in outgoing storage data writes to storage of the information handling system, one or more monitored peaks in programmable integrated circuit utilization, and/or one or more peaks in network data transmission activity.

3. The method of claim 1, where the programmable integrated circuit comprises a central processing unit (CPU) that is executing an operating system (OS), and where the method further comprises executing an application on the CPU to provide the simulated keystroke input data as an OS keyboard input data stream to the OS.

4. The method of claim 1, further comprising responding to detecting the existence of a key logger process executing on the programmable integrated circuit by at least one of searching the contents of the input/output (I/O) data from the detected key logger process for presence of captured keys or searching network data transmissions from the information handling system for presence of captured keys.

5. The method of claim 1, further comprising responding to detecting the existence of a key logger process executing on the programmable integrated circuit by at least one of notifying a local information handling system user and/or notifying a remote administrative or information technology (IT) server across a network of the detection of the key logger process.

6. The method of claim 1, further comprising providing the simulated keystroke input data as a cryptographically random pattern of simulated character key stroke values to the programmable integrated circuit of the information handling system; and where the known characteristics of the simulated keystroke input data comprise a pattern of keystroke values as a function of time.

7. The method of claim 1, where the pattern of simulated keystrokes that varies as a function of time comprises a pattern of number of simulated keystrokes as a function of time; where the monitoring of system resource usage activity comprises monitoring programmable integrated circuit utilization as a function of time; and where the detecting comprises detecting that peaks in monitored host programmable integrated circuit utilization correspond in time to peaks in the number of simulated keys provided to the programmable integrated circuit as a function of time.

8. The method of claim 1, further comprising retrieving from non-volatile memory or storage of the information handling system a stored pre-determined varying pattern of a number of simulated keystrokes as a function of time; and then providing the simulated keystroke input data to the programmable integrated circuit of the information handling system according to the retrieved pre-determined varying pattern of the number of simulated keystrokes as a function of time.

9. The method of claim 1, where the pattern of simulated keystrokes that varies as a function of time is provided as a frequency of simulated keystrokes.

10. The method of claim 1, further comprising responding to detecting the existence of a key logger process executing on the programmable integrated circuit by checking an identity of a destination remote network endpoint to which outgoing network packets are being sent from the detected key logger process against a white list and/or black list of websites; and then blocking the network data transmission of the outgoing network packets to the destination remote network endpoint only if the destination remote network endpoint is found to be blacklisted and/or not whitelisted.

11. The method of claim 1, where the pattern of simulated keystrokes that varies as a function of time comprises at least one of a pattern of quantity of keystrokes as a function of time, pattern of keystroke data size as a function of time, pattern of keystroke value as a function of time.

12. The method of claim 1, further comprising retrieving a minimum threshold percentage value from a non-volatile memory or system storage of the information handling system; and then determine that the key logger process is executing on the programmable integrated circuit only if a percentage of the total number of peaks of the monitored system resource usage activity that correspond in time to the varying pattern of the simulated keystroke input data exceeds the retrieved minimum threshold percentage value.

13. A method, comprising:
providing simulated keystroke input data for a programmable integrated circuit of an information handling system, the simulated keystroke input data has one or more known characteristics;
monitoring system resource usage activity of the programmable integrated circuit or of at least one other information handling system component that is coupled to the programmable integrated circuit while providing the simulated keystroke input data to the programmable integrated circuit; and
detecting the existence of a key logger process executing on the programmable integrated circuit by identifying at least one characteristic of the monitored system resource usage activity that at least partially corresponds to at least one of the known characteristics of the simulated keystroke input data;
where the method further comprises: shutting down one or more executing known user software applications executing on the programmable integrated circuit, then capturing a baseline of current system resource activity while the known user software applications remain shut down, then filtering out any system resource activity of whitelisted applications or other known processes that remain executing on the programmable integrated circuit, and then detecting the existence of the key logger process executing on the programmable integrated circuit by identifying the at least one characteristic of the monitored system resource usage activity that is added to the filtered baseline and that at least partially corresponds to the at least one of the known characteristics of the simulated keystroke input data.

14. The method of claim 13, further comprising identifying the key logger process as the process corresponding to the process generating the monitored system resource usage activity having the characteristic that at least partially corresponds to the at least one of the known characteristics of the simulated keystroke input data.

15. The method of claim 14, further comprising responding to detecting the existence of a key logger process executing on the programmable integrated circuit by shutting down or blocking execution of the identified detected key logger process on the programmable integrated circuit.

16. An information handling system, comprising at least one programmable integrated circuit programmed to:
process data and provide simulated keystroke input data for the at least one programmable integrated circuit, the simulated keystroke input data being provided as a pattern of simulated keystrokes that varies as a function of time;
monitor system resource usage activity versus time of the least one programmable integrated circuit or of at least one other information handling system component that is coupled to the programmable integrated circuit while providing the simulated keystroke input data to the programmable integrated circuit; and
detect the existence of a key logger process executing on the programmable integrated circuit by identifying one or more peaks in the monitored system resource usage activity that correspond in time to the varying pattern of the simulated keystroke input data.

17. The information handling system of claim 16, further comprising:
a system storage device storing data and coupled to the programmable integrated circuit; and
a network interface device coupled to the programmable integrated circuit;
where the one or more peaks in monitored system resource usage activity comprise at least one of one or more monitored peaks in outgoing storage data writes to the system storage device, one or more monitored peaks in programmable integrated circuit utilization, and/or one or more peaks in network data transmission activity.

18. The information handling system of claim 16, where the programmable integrated circuit comprises a central processing unit (CPU) programmed to execute an application on the CPU to provide the simulated keystroke input data as an operating system (OS) keyboard input data stream to the OS.

19. The information handling system of claim 16, where the programmable integrated circuit is programmed to respond to detecting the existence of a key logger process executing on the programmable integrated circuit by at least one of searching the contents of the input/output (I/O) data from the detected key logger process for presence of captured keys or searching network data transmissions from the information handling system for presence of captured keys.

20. The information handling system of claim 16, further comprising a user interface coupled to the programmable integrated circuit; and where the programmable integrated circuit is programmed to respond to detecting the existence of a key logger process executing on the programmable integrated circuit by at least one of notifying a local information handling system user on a user interface of the information handling system and/or notifying a remote administrative or information technology (IT) server across a network of the detection of the key logger process.

21. The information handling system of claim 16, where the programmable integrated circuit is programmed to provide the simulated keystroke input data as a cryptographically random pattern of simulated character key stroke values to the programmable integrated circuit of the information handling system; and where the known characteristics of the simulated keystroke input data comprise a pattern of keystroke values as a function of time.

22. The information handling system of claim 21, where the pattern of simulated keystrokes that varies as a function of time comprises a number of keystrokes as a function of time; where the monitoring of system resource usage activity comprises monitoring programmable integrated circuit utilization as a function of time; and where the detecting comprises detecting that peaks in monitored host programmable integrated circuit utilization correspond in time to peaks in the number of simulated keys provided to the programmable integrated circuit as a function of time.

23. An information handling system, comprising at least one programmable integrated circuit programmed to:
  process data and provide simulated keystroke input data for the programmable integrated circuit, the simulated keystroke input data having one or more known characteristics;
  monitor system resource usage activity of the least one programmable integrated circuit or of at least one other information handling system component that is coupled to the programmable integrated circuit while providing the simulated keystroke input data to the programmable integrated circuit; and
  detect the existence of a key logger process executing on the programmable integrated circuit by identifying at least one characteristic of the monitored system resource usage activity that at least partially corresponds to at least one of the known characteristics of the simulated keystroke input data;
  where the programmable integrated circuit is further programmed to:
    capture a baseline of current system resource activity while one or more known user software applications on the programmable integrated circuit are shut down,
    then filter out any system resource activity of whitelisted applications or other known processes that remain executing on the programmable integrated circuit, and
    then detect the existence of the key logger process executing on the programmable integrated circuit by identifying the at least one characteristic of the monitored system resource usage activity that is added to the filtered baseline and that at least partially corresponds to the at least one of the known characteristics of the simulated keystroke input data.

24. The information handling system of claim 23, where the programmable integrated circuit is programmed to identify the key logger process as the process corresponding to the process generating the monitored system resource usage activity having the characteristic that at least partially corresponds to the at least one of the known characteristic of the simulated keystroke input data.

25. The information handling system of claim 24, where the programmable integrated circuit is programmed to respond to detecting the existence of a key logger process executing on the programmable integrated circuit by shutting down or blocking execution of the identified detected key logger process on the programmable integrated circuit.

\* \* \* \* \*